United States Patent [19]
Pederson et al.

[11] Patent Number: 5,966,581
[45] Date of Patent: Oct. 12, 1999

[54] METHOD OF FORMING BY COLD WORKED POWDERED METAL FORGED PARTS

[75] Inventors: Jack E. Pederson, Ypsilanti; Hayward P. Summers, Plymouth, both of Mich.

[73] Assignee: Borg-Warner Automotive, Inc., Sterling Heights, Mich.

[21] Appl. No.: 08/706,133

[22] Filed: Aug. 30, 1996

[51] Int. Cl.⁶ .................................. B22F 3/12; B22F 5/08
[52] U.S. Cl. ................................................ 419/28; 419/38
[58] Field of Search .................................. 419/28, 26, 38

[56] References Cited

U.S. PATENT DOCUMENTS

| | | | |
|---|---|---|---|
| 4,029,475 | 6/1977 | Hamai et al. | 75/247 |
| 4,393,562 | 7/1983 | Smith | 29/149.5 DP |
| 4,398,969 | 8/1983 | Melton et al. | 148/11.5 C |
| 4,464,205 | 8/1984 | Kumar et al. | 148/11.5 P |
| 4,587,096 | 5/1986 | Mankins et al. | 419/27 |
| 4,704,251 | 11/1987 | Kraemer | 419/17 |
| 4,853,179 | 8/1989 | Shiina | 419/28 |
| 4,867,806 | 9/1989 | Shiina | 148/11.5 P |

*Primary Examiner*—Ngoclan Mai
*Attorney, Agent, or Firm*—Lyon & Artz P.L.C.; Greg Dziegielewski

[57] ABSTRACT

A method for manufacturing metal by a cold worked powdered metal forging process is disclosed. A certain amount of a powdered metal is measured out and then compacted into a briquette or other compact. The briquette is then sintered to form a preform. After sintering, the preform is then cold worked to increase its strength. After cold working, the preform is forged to form the desired part. The resultant part has improved fatigue life, surface finish, and metallurgical characteristics.

7 Claims, 2 Drawing Sheets

METHOD OF FORMING BY COLD WORKED POWDERED METAL FORGED PARTS

TECHNICAL FIELD

The present invention relates to an improved method for manufacturing parts from powdered metal. More specifically, the present invention relates to a method for manufacturing, by cold worked powdered metal forging, one-way clutch races for a roller clutch that has improved strength and fatigue life.

BACKGROUND OF THE PRESENT INVENTION

The formation of powder forged precision components is well known in the art. This formation process involves compacting a powdered metal into a briquette or other form, sintering the powdered metal briquette to form a preform or blank, and then forging the blank or preform such that a part is formed with the desired shape and dimensions. After the sintering step, the preform is typically transferred directly from the sintering furnace to the forging press without any intermediary cooling. Alternatively, it is also known that the preform can be allowed to cool and then be re-heated by HF induction or other means, prior to the forging process. Whether the preform is transferred directly from the sintering furnace to be formed or is allowed to cool and then is reheated prior to forging, the heated preform or blank is placed into a forging press and then hammered or otherwise formed into the desired part having the proper size and shape.

The as-forged surface produced by conventional powdered metal forging has surface finish, porosity, and oxide characteristics which are dependant on many factors such as preform shape, die lubrication, preform temperature, tooling temperature, and forging tonnage. Typically, the resultant as-forged surface finish and porosity of the preforms manufactured by these prior processes have an optimization limit depending upon these process characteristics.

One application for these preforms or blanks that are formed by these prior processes is the formation of a cam for an inner or outer race of a one-way roller clutch. The surface finish, porosity, and surface oxides of these products, influence the tendency of the cam surface to spalling or other failure. Once the cam surface spalls or otherwise fails, the clutch becomes inoperable and must be replaced. Because the cams of one-way clutch races for roller clutches are more susceptible to spalling at higher loads, sprag clutches are typically used in applications requiring a one-way clutch. Sprag clutches, however, are far more expensive to manufacture than roller clutches.

SUMMARY OF THE INVENTION

It is an object of the present invention to provide a method for forming forged surfaces with improved fatigue life, surface finish and metallurgical characteristics, that is relatively inexpensive to produce. It is a related object of the present invention to provide a method of forming a cam surface for a one-way clutch race with improved strength and surface finish that decreases the tendency of the cam surface to spall and is inexpensive as compared to other one-way clutches.

In accordance with the objects of the present invention, an improved method for forming a part from a preform or blank is disclosed. With the disclosed method, a predetermined amount of a powered metal is used for the manufacture of a part. The amount of powdered metal is determined by the size and shape of the part to be formed. This powdered metal is then compacted into a briquette or other compacted form. The compacted powder is then sintered to form a preform or blank with increased strength and density. The preform or blank is then cold worked after the sintering process, preferably by roller burnishing techniques. After the blank is cold worked, it is forged into its desired shape in a forging die or press. This sinter forging process provides significant improvements over prior precision forged processes, including improved ductility and strength, improved consistency and accuracy of preform dimensions, and better as-forged surface finish, porosity, oxide depth, and frequency.

Additional features and advantages of the present invention will become apparent to one of ordinary skill in the art upon consideration of the following detailed description of the present invention.

BRIEF DESCRIPTION OF THE DRAWINGS

Preferred embodiments of the present invention are described by reference to the following drawings.

DESCRIPTION OF THE PREFERRED EMBODIMENTS

Figure 1:
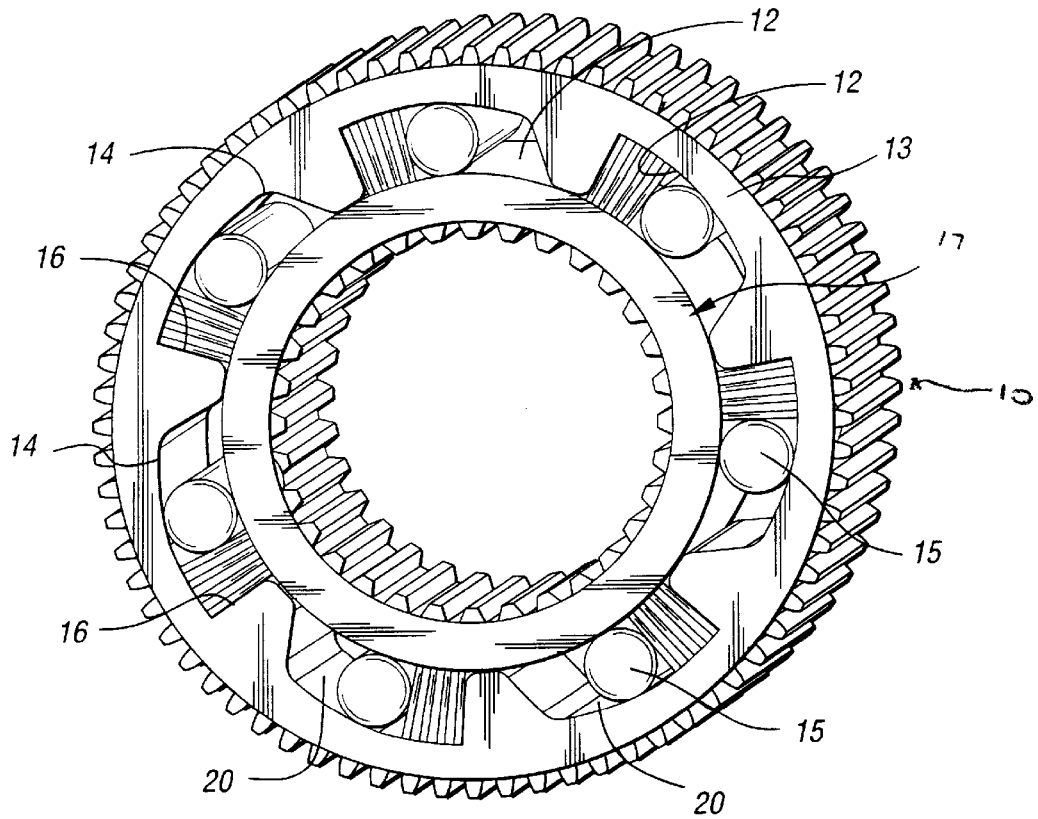
FIG. 1 is an illustration of a cam of a one-way clutch race of a roller clutch.

In accordance with the preferred embodiments, a method of forming a product from powdered metal with sufficient strength to perform its required function is disclosed.

The first step preferably consists of measuring out a certain amount of powdered metal as needed to form a part with the desired size and shape. The powder is then compacted into a briquette or other form. Once the powdered metal has been compacted, it is sintered. Sintering is the thermal treatment of a loose powder or compact at a temperature below the melting point of the main constituent for the purpose of increasing its strength by bonding together of the constituent particles. The conditions under which sintering occurs varies depending upon the type of powdered metal used. These conditions are well known to those of ordinary skill in the art. During sintering, the powdered briquette is heated to below the melting point of the powder causing adjacent particles to increase their bond making the ultimate part stronger. The resultant effect of the sintering process is the formation of a metal blank or preform.

In accordance with the preferred embodiments, the compacted powder is somewhat porous. During sintering of the compacted powder, the pores become substantially spherical in shape and the compact decreases in size increasing its overall strength. It is known to one of ordinary skill in the art how to measure the shrinkage given the manufacturing parameters so that a part with the proper dimensions can be formed.

Cold working is also a well known process for plastically deforming metal. This is generally carried out under room temperatures and induces strain hardening in the part. Cold working is typically an alternative to hot working and is performed on a part after the forging process.

In the preferred embodiment, after the compact has been sintered, the resultant preform is allowed to cool to room temperature and then cold worked. Alternatively, the preform may be cold worked at a temperature below room temperature. The cold working step is preferably performed by roller burnishing the preform. Roller burnishing is a well known process for powdered metal and wrought steel manufacturers, but it has never been conducted before a forging process to enhance the material conditions of the as-forged surface. Alternatively, the preform may be cold worked alone, without further treatment, by blasting with various types of materials known in the art, including glass and sand. The blasting locally densifies the surface resulting in a surface finish that is rough as compared to the surface produced by cold working by roller burnishing, but better than surfaces that are forged and not cold worked at all.

After the preform has been subjected to strain hardening by the cold working step, it is then forged. The preform is reheated and then placed into a forging die and hammered into its desired shape. Unlike prior processes that either only cold work the preform or only forge the preform, the disclosed method provides for both cold working and forging with the cold working step occurring prior to forging. In the preferred embodiment of roller burnishing, the advantage for non-cylindrical geometry is clear. A non-cylindrical forged surface cannot be roller burnished due to the interference between a round tool and a non-cylindrical cross section. In addition, in applications where the forging is quenched and has hardness precluding cold working, the cold working can be done to the preform with improvements seen in the as-forged surface. In the preferred embodiment, the advantages of roller burnishing, namely lower surface finish, higher strength, and improved metallurgy, are combined with the advantages of forging, namely full density steel and varied geometries, to produce a steel part superior to both a conventional powder forging, and a sintered/burnished component. Cold working of a preform between the sintering step and the forging step was not previously done since it was believed that no real benefit would be gained, and the cost of adding an extra unnecessary step was expensive.

A preferred application for the disclosed process is in the manufacture of one-way clutch races. FIG. 1 is a schematic illustration representative of a one-way clutch race for a roller clutch 10. As shown in FIG. 1, the outer race 13 of the disclosed clutch 10 has a plurality of pockets 12 on it inner surface. These pockets 12 are composed of cam surfaces 20 on which a roller 15 rides, and backstop surfaces 16 which hold springs against the rollers 15. When force is applied to the outer race 13 in a counter clockwise direction, the rollers 15 are wedged between the cam surface 20 of the outer race 13 and the smooth outside diameter of the inner race 17 transferring the force to the inner race 17. Thus, the cam surface 20 must be designed to withstand high loads as it handles the majority of the loading while the clutch 10 is engaged. Conversely, when the force is applied clockwise, the rollers 15 are released and the outer race 13 is allowed to spin or freewheel, while the springs prevent the rollers from becoming dislodged. This configuration is typically used to assist in the disengagement of a clutch in order to change gears.

Typical one-way clutch races are designed to tolerate a certain amount of stress. Different types of one-way clutches because of their size and characteristics can withstand higher loads than other one way clutches. These differences are well known to those of skill in the art as is the difference in cost between these various clutches. Presently, one-way clutch races for use in sprag clutches can withstand higher loads than those used in the roller clutch shown in FIG. 1.

Moreover, in some applications, the roller clutch lasts significantly less cycles than sprag clutches under the same loading conditions due to fatigue of the cam surface 20 as evidenced by spalling. However, because roller clutches are less expensive to manufacture than sprag clutches, it would be a significant advantage if they could be manufactured for longer fatigue life. With the disclosed process, the cam surface 20 of the outer races 13 or the inner races 17 can be manufactured so as to extend the fatigue life of the cam as evidence by spalling, enabling the substitution of a roller clutch where a sprag clutch might otherwise be required. Roller clutches having one-way clutch races manufactured in accordance with the disclosed process can replace sprag clutches in some applications because of their lower relative cost.

Testing was performed to demonstrate the differences between the surface characteristics of parts formed by the disclosed processes and parts formed by prior processes. Surface criteria compared included surface finish porosity (how porous the surface was), oxides and the tests revealed that parts manufactured by the disclosed method had superior surface characteristics over prior processes. The data listed below illustrates the differences between the parts formed by both processes:

a. The surface finish of the as-forged cam surface manufactured in accordance with the prior process was measured at 77–83 microinches. Thesurface finish of the roller burnished as-forged cam surface manufactured in accordance with the present invention was 35–41 microinches.

b. The oxides on the as-forged cam surface manufactured in accordance with the prior process were found to be 0.006" to 0.007" deep every 0.005". The oxides on as-forged cam surface manufactured in accordance with the present invention were found to be 0.002" to 0.003" deep every 0.015".

c. The porosity of the as-forged cam surface manufactured in accordance with the prior process was measured at microporosity to 0.015" deep. The porosity of the roller burnished as-forged cam surface manufactured in accordance with the present invention was measured at microporosity to 0.003" deep.

Also, preliminary results based on stroker testing of known and inventive products indicates that the number of cycles to failure due to spalling was approximately twice as great with parts made in accordance with the present invention.

Figure 2:
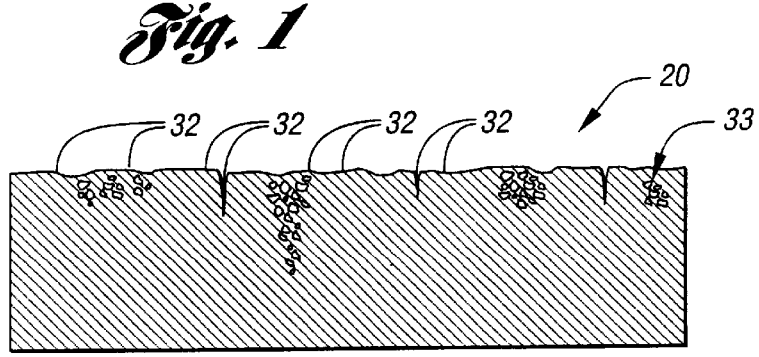
FIG. 2 is an illustration of the surface of a part formed by a prior art forging process.
Figure 3:
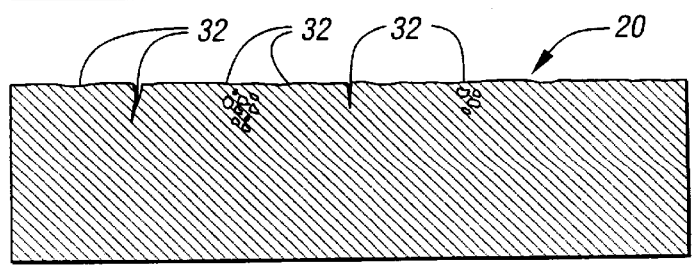
FIG. 3 is an illustration of the surface of a part forged in accordance with another embodiment of the present invention.
Figure 4:
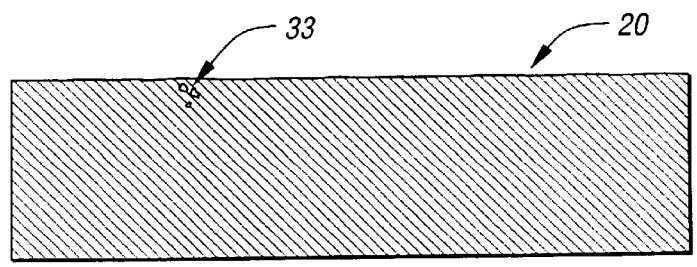
FIG. 4 is an illustration of the surface of a part forged in accordance with another preferred embodiment of the present invention.

As indicated above, cold working of preforms prior to the forging process provides cam surfaces with several improved characteristics, including surface finish, porosity, oxide depth, and frequency. FIGS. 2, 3, and 4 are illustrations that are representative of photographs of the enlarged surfaces 30 of parts manufactured according to three different manufacturing processes. These figures are representative of the inner surface 20 of the race as shown in FIG. 1.

The part of FIG. 2 was manufactured by prior forging processes, the part of FIG. 3 was manufactured by cold worked blasting and then forging, while the part of FIG. 4 was manufactured by cold worked roller burnishing and then forging. As shown in FIGS. 2 and 3, the surface finish of the surface 20 that was cold worked by blasting and then forged is improved as compared to the finish of the surface 20 of an as-forged preform that was not cold worked at any time. FIG. 4 illustrates the surface 20 of a preform that was cold worked by roller burnishing and then forged. The surface 20 of the preform of FIG. 4 has improved surface finish over the surface 20 illustrated in FIGS. 2 and 3. The improvement can be measured by the lack of surface imperfections and irregularities 32 (which manifest themselves as voids and oxides), and by the lack of porosity in FIG. 4. FIGS. 2 and 3 illustrate many more voids and oxides, and increased porosity depth and frequency.

Figure 5:
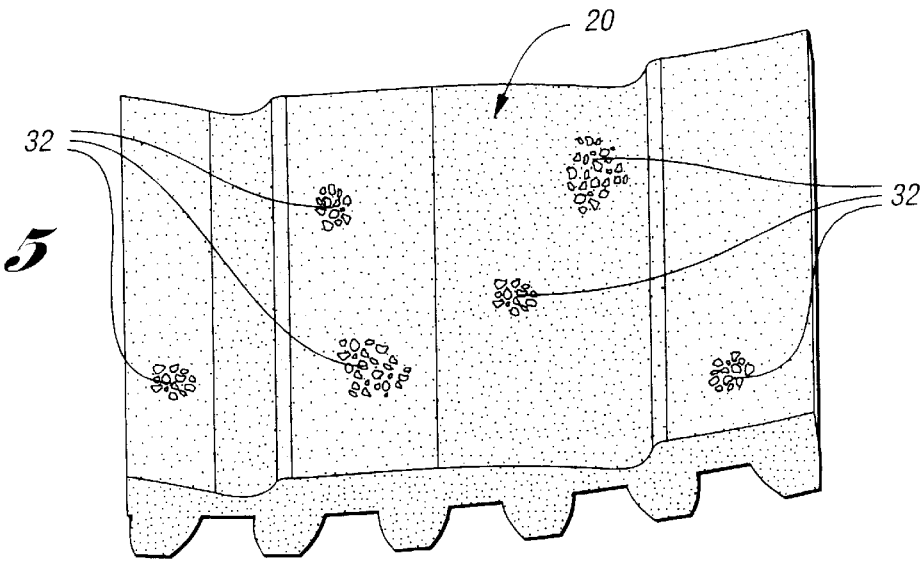
FIG. 5 is an illustration of a cam surface forged by a prior art process.
Figure 6:
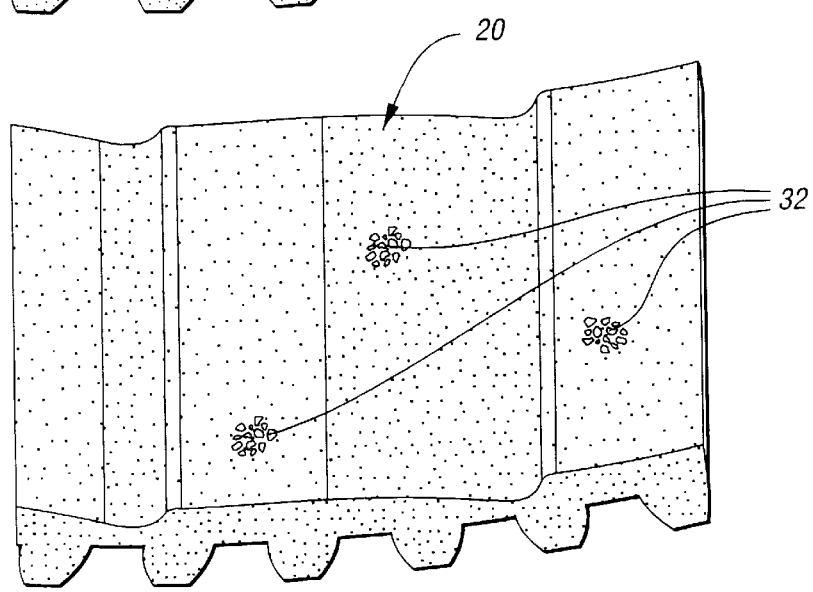
FIG. 6 is an illustration of a cam surface forged in accordance with a preferred embodiment of the present invention.
Figure 7:
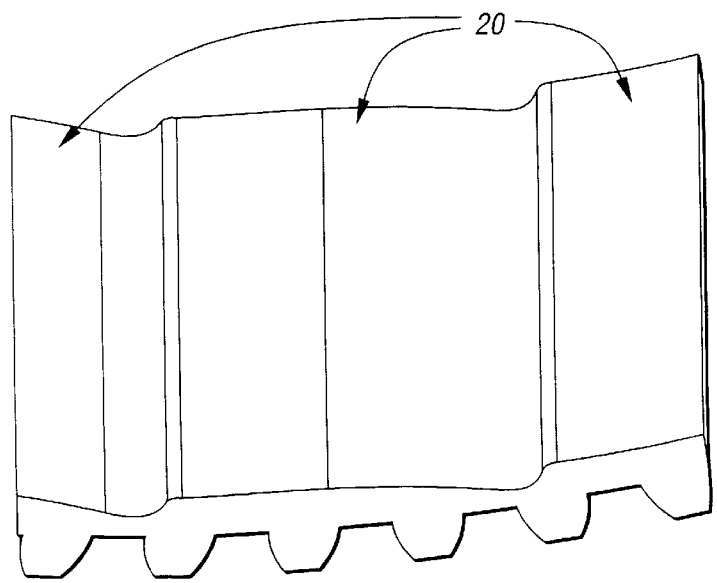
FIG. 7 is an illustration of a cam surface forged in accordance with another preferred embodiment of the present invention.

FIGS. 5 through 7 are illustrative of normal size photographs of cam surfaces 20 manufactured by these different processes manufactured in accordance with prior processes. FIG. 5 illustrates an as-forged cam surface 20 that was not subjected to cold working while FIG. 6 illustrates an as-forged cam surface 20 that was cold worked by blasting and then forged. FIG. 7 illustrates a cam surface that was cold worked by roller burnishing and then forged. The tests demonstrated that the cam surface 20 formed by blasting prior to forging shown in FIG. 6 had better characteristics than the cam surface 20 formed without any cold working as shown in FIG. 5. The tests also demonstrated that the cam surface 20 formed by roller burnishing prior to forging, shown in FIG. 7, had significantly better characteristics than the cam surfaces 20 formed by the processes illustrated in FIGS. 5 and 6.

While only one preferred embodiment of the invention has been described hereinabove, those of ordinary skill in the art will recognize that this embodiment may be modified and altered without departing from the central spirit and scope of the invention. Thus, the embodiment described hereinabove is to be considered in all respects as illustrative and not restrictive, the scope of the invention being indicated by the appended claims, rather than by the foregoing descriptions, and all changes which come within the meaning and range of equivalency of the claims are intended to be embraced herein.

We claim:

1. A method for forming forgings for cam surfaces in one-way clutch races, comprising the steps of:

providing a powdered metal;

compacting said powdered metal;

sintering said compacted powdered metal to form a preform;

cold working said preform to improve the strength of said preform; and forging said preform into a clutch race having a desired shape with desired specifications.

2. The method of claim 1, wherein said cold working step is comprised of roller burnishing said preform.

3. The method of claim 1, wherein said cold working step is comprised of blasting said preform.

4. A method for forming cam surface in one-way clutch races, comprising the steps of:

providing powdered metal compact;

sintering said powdered metal compact to form a preform;

cold working said preform by roller burnishing; and forging said preform into said clutch race wherein said clutch race has improved strength and surface finish.

5. The method of claim 4, wherein said clutch race is for use in a roller clutch.

6. The method of claim 4, wherein said surface finish is less than 50 microinches.

7. The method of claim 4, wherein the surface of said clutch race has a microporosity depth of less than 0.3".

* * * * *